(12) United States Patent
Jaime

(10) Patent No.: US 11,044,899 B2
(45) Date of Patent: Jun. 29, 2021

(54) MONKEY LINE PULLER

(71) Applicant: Edman Jaime, Miami Lakes, FL (US)

(72) Inventor: Edman Jaime, Miami Lakes, FL (US)

( * ) Notice: Subject to any disclaimer, the term of this patent is extended or adjusted under 35 U.S.C. 154(b) by 0 days.

(21) Appl. No.: 16/362,589

(22) Filed: Mar. 22, 2019

(65) Prior Publication Data

US 2020/0296948 A1 Sep. 24, 2020

(51) Int. Cl.
*A01K 91/04* (2006.01)

(52) U.S. Cl.
CPC .................... *A01K 91/04* (2013.01)

(58) Field of Classification Search
CPC ................................................ A01K 91/04
USPC .......................................................... 43/57.1
See application file for complete search history.

(56) References Cited

U.S. PATENT DOCUMENTS

| | | | | |
|---|---|---|---|---|
| 384,635 A * | 6/1888 | Maynard | ........ | A01B 1/00 172/370 |
| 1,210,845 A * | 1/1917 | Roth | ........ | A01K 91/04 289/17 |
| 2,682,126 A * | 6/1954 | Shepherd | ........ | A01K 91/04 269/254 CS |
| 2,825,592 A * | 3/1958 | Semple | ........ | B65H 69/04 289/17 |
| 2,843,961 A * | 7/1958 | Semple | ........ | A01K 91/04 289/17 |
| 3,252,724 A * | 5/1966 | Kearns | ........ | A01K 91/04 289/17 |
| 4,333,257 A * | 6/1982 | Burrell | ........ | A01K 91/04 30/298 |
| 4,414,712 A * | 11/1983 | Beggins | ........ | B63B 21/00 114/218 |
| 5,065,482 A * | 11/1991 | Lofy | ........ | A43B 1/0072 24/712.1 |
| D361,368 S * | 8/1995 | Sugai | ........ | D22/134 |
| 5,593,189 A * | 1/1997 | Little | ........ | A01K 91/04 289/17 |
| 5,829,798 A * | 11/1998 | Little | ........ | A01K 91/04 289/17 |
| 6,473,944 B1 * | 11/2002 | Vazin | ........ | A43C 1/00 24/129 A |
| 6,902,212 B1 * | 6/2005 | Mize | ........ | A63H 27/10 289/17 |
| 10,549,208 B1 * | 2/2020 | Herren | ........ | A63H 27/10 |
| 2017/0014883 A1 * | 1/2017 | Streen | ........ | B25D 5/00 |

* cited by examiner

*Primary Examiner* — Christopher R Harmon
(74) *Attorney, Agent, or Firm* — Ruben Alcoba, Esq.

(57) ABSTRACT

A hand-held device used for fishing to secure the fishing knot to a hook. Having (4) four holes (2) two rear oval holes of equal size for finger insert support and (2) two smaller front holes of different sizes for hook safety support as the hand pulls to create tension in the fishing line.

2 Claims, 1 Drawing Sheet

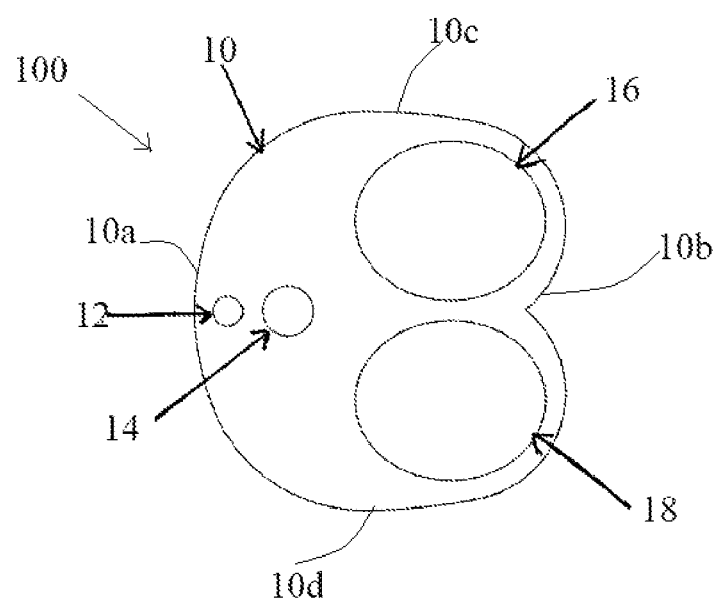

MONKEY LINE PULLER

BRIEF DESCRIPTION OF THE DRAWINGS

The accompanying drawings and figures illustrate an embodiment of the present invention:

FIG. 1 is a side view of the present invention.

DETAIL DESCRIPTION OF THE INVENTION

The present invention is a monkey line puller.

FIG. 1 shows the monkey line puller of the present invention, from herein after the monkey line puller shall be referred as a hand-held fishing device 100 that is used by fishermen to secure a fishing knot to a hook. The handheld device 100 comprises of a semi-circular finger held puller 10, the semi-circular finger held puller 10 defines a front side 10a and a rear side 10b, the rear side 10b of the semi-circular finger held puller 10 defines an upper aperture 16 and a lower aperture 18 that are dimensioned to hold two fingers of a user, the semi-circular finger held puller 10 also defines a first central thru hole 12 and a second central thru hole 14, the first central thru hole 12 is defined at a position that is adjacent to the front side 10a and that is at an equal distance from a top side 10c and a bottom side 10d of the semi-circular finger held puller 10, and the second central thru hole 14 is defined at a position that is adjacent to the first central thru hole 12 that is at an equal distance from the top side 10c and the bottom side 10d, the second thru hole 14 is at a position that is closer to the rear side 10b of the semi-circular finger held puller 10, the first thru hole 12 and second thru hole 14 are linearly aligned between the top side 10c and the bottom side 10d of the semi-circular finger puller 10.

The present invention is used by placing the user's two finger within the upper aperture 16 and the lower aperture 18 of the semi-circular finger held puller 10. Then, placing a fishing hook that has a fishing line attached to it in either the first central thru hole 12 or the second central thru hole 14. Lastly, pulling the finger held puller 10 away from the object or hand that is securing the fishing knot on the fishing hook so that the fishing knot is tightened on the fishing hook.

In an embodiment of the present invention, the second thru hole 14 has a larger diameter than the first thru hole 12.

What is claimed is:

1. A hand-held fishing device that is used by fishermen to secure a fishing knot to a hook, the handheld device comprises of a semi-circular finger held puller, the semi-circular finger held puller defines a front side and a rear side, the rear side of the semi-circular finger held puller defines an upper aperture and a lower aperture that are dimensioned to hold two fingers of a user, the semi-circular finger held puller also defines a first central thru hole and a second central thru hole, the first central thru hole is defined at a position that is adjacent to the front side and that is at an equal distance from a top side and a bottom side of the semi-circular finger held puller, and the second central thru hole is defined at a position that is adjacent to the first central thru hole that is at an equal distance from the top side and the bottom side, the second thru hole is at a position that is closer to the rear side of the semi-circular finger held puller, the first thru hole and second thru hole are linearly aligned between the top side and the bottom side of the semi-circular finger puller.

2. The hand-held fishing device that is used by fishermen to secure a fishing knot to a hook of claim 1, wherein the second thru hole has a larger diameter than the first thru hole.

* * * * *